(12) United States Patent
Lokowandt et al.

(10) Patent No.: US 8,942,839 B2
(45) Date of Patent: Jan. 27, 2015

(54) USER INTERFACE INCLUDING SCHEDULING HINT AND MATERIAL SUFFICIENCY INDICATOR FOR PRODUCTION PLANNING

(75) Inventors: Bernhard Lokowandt, Heidelberg (DE); Stefan Siebert, Hockenheim (DE)

(73) Assignee: SAP SE, Walldorf (DE)

( * ) Notice: Subject to any disclaimer, the term of this patent is extended or adjusted under 35 U.S.C. 154(b) by 440 days.

(21) Appl. No.: 13/227,196

(22) Filed: Sep. 7, 2011

(65) Prior Publication Data

US 2013/0060372 A1    Mar. 7, 2013

(51) Int. Cl.
G06F 19/00    (2011.01)
G06Q 10/00    (2012.01)
G06Q 10/06    (2012.01)

(52) U.S. Cl.
CPC ............................ G06Q 10/063114 (2013.01)
USPC ........ 700/100; 705/7.13; 705/7.14; 705/7.15; 705/7.16; 705/7.17; 705/7.18; 705/7.19; 705/7.21; 705/7.22; 705/7.23; 705/7.24; 705/7.25; 705/7.26; 705/7.27

(58) Field of Classification Search
None
See application file for complete search history.

(56) References Cited

U.S. PATENT DOCUMENTS

| | | | | |
|---|---|---|---|---|
| 5,216,593 | A * | 6/1993 | Dietrich et al. | 345/467 |
| 5,842,173 | A * | 11/1998 | Strum et al. | 705/2 |
| 5,890,134 | A * | 3/1999 | Fox | 705/7.24 |
| 6,415,196 | B1 * | 7/2002 | Crampton et al. | 700/100 |
| 6,584,501 | B1 * | 6/2003 | Cartsonis et al. | 709/224 |
| 7,904,192 | B2 * | 3/2011 | Chua et al. | 700/100 |
| 8,531,459 | B1 * | 9/2013 | Ponce de Leon | 345/440 |
| 2001/0001864 | A1 * | 5/2001 | Page et al. | 709/205 |
| 2001/0014836 | A1 * | 8/2001 | Tamaki et al. | 700/99 |
| 2002/0198616 | A1 * | 12/2002 | Crampton et al. | 700/99 |
| 2003/0163357 | A1 * | 8/2003 | Engleman et al. | 705/7 |
| 2003/0200130 | A1 * | 10/2003 | Kall et al. | 705/8 |
| 2005/0154625 | A1 * | 7/2005 | Chua et al. | 705/7 |
| 2009/0157216 | A1 * | 6/2009 | Krishnaswamy et al. | 700/121 |
| 2010/0217418 | A1 * | 8/2010 | Fontanot | 700/100 |
| 2010/0217419 | A1 * | 8/2010 | Fontanot | 700/101 |
| 2011/0130856 | A1 * | 6/2011 | Fontanot | 700/100 |

OTHER PUBLICATIONS

Schumann-A., "SAP-R/3 in Process Industries: Expectations, Experiences and Outlooks", Elsevier, 1997, pp. 161-166.*
Zhang et al., "Self-Construction Production Scheduling System" ,IEEE, 2006, pp. 519-523.*
Chan et al.,"An Efficient Format for Nearly Constant-Time Access to Arbitrary Time Intervals in Large Trace Files", Argonne National Laboratory, 2007, pp. 16.*
Mulvehill-A., "A User Interface for a Knowledge-Based Planning and Scheduling System", IEEE, 1998, pp. 514-521.*

* cited by examiner

*Primary Examiner* — Sean Shechtman
*Assistant Examiner* — Thomas Stevens
(74) *Attorney, Agent, or Firm* — Brake Hughes Bellermann LLP (57) ABSTRACT

The description refers to a method, computer program product, and computer system for displaying a chart for production planning. The chart includes a timeline, a material area associated with each of one or more materials and a resource area associated with each of one or more resources. The chart also includes a material sufficiency indicator provided within one or more of the material areas to indicate whether or not a sufficient amount of the associated material is available at one or more identified times to meet a demand of the one or more scheduled operations. The chart includes a scheduling hint that is displayed within a material area when an operation identifier has been selected. The scheduling hint identifies one or more portions within the material area for a material as providing either sufficient material or insufficient material for performance of the operation associated with the selected operation identifier.

27 Claims, 10 Drawing Sheets

USER INTERFACE INCLUDING SCHEDULING HINT AND MATERIAL SUFFICIENCY INDICATOR FOR PRODUCTION PLANNING

TECHNICAL FIELD

This description is directed generally to production planning, and in particular, to a user interface that includes a scheduling hint and a material sufficiency indicator which may be used for production planning.

BACKGROUND

Production planning may involve, for example, efficient planning of production processes in such a manner so as to optimize (or at least improve) output or profit, and/or best meet the company's objectives or customer demand. For example, production planning may include the efficient planning, allocation and/or scheduling of various resources, materials and operations or processes. A result of production planning may, for example, include a set of production orders that are designed to best meet customer demand while respecting raw material availability and other limitations on production.

SUMMARY

In one general aspect, a computer program product is provided. The computer program product is tangibly embodied on a computer-readable storage medium and includes executable code that, when executed, is configured to cause at least one data processing apparatus to display a chart for production planning, the chart including a timeline, a material area associated with each of one or more materials and a resource area associated with each of one or more resources, wherein an operation identifier is provided at a location within one of the resource areas to indicate a time that an associated operation has been scheduled to be performed using the associated resource. The chart also includes a material sufficiency indicator provided within one or more of the material areas to indicate whether or not a sufficient amount of the associated material is available at one or more identified times to meet a demand of the one or more scheduled operations. The chart further includes a scheduling hint that is displayed within a material area when an operation identifier has been selected or dragged for scheduling an associated operation within the chart. The scheduling hint identifies one or more portions within the material area for a material as providing either sufficient material or insufficient material for performance of the operation associated with the selected operation identifier.

In another general aspect, a computer implemented method is provided that includes displaying a chart for production planning. The chart includes a timeline, a material area associated with each of one or more materials and a resource area associated with each of one or more resources, wherein an operation identifier is provided at a location within one of the resource areas to indicate a time that an associated operation has been scheduled to be performed using the associated resource. The chart also includes a material sufficiency indicator provided within one or more of the material areas to indicate whether or not a sufficient amount of the associated material is available at one or more identified times to meet a demand of the one or more scheduled operations. The chart further includes a scheduling hint that is displayed within a material area when an operation identifier has been selected or dragged for scheduling an associated operation within the chart. The scheduling hint identifies one or more portions within the material area for a material as providing either sufficient material or insufficient material for performance of the operation associated with the selected operation identifier.

In another general aspect, an apparatus includes display logic configured to display a chart for production planning, the chart including a timeline, a material area associated with each of one or more materials and a resource area associated with each of one or more resources, wherein an operation identifier is provided at a location within one of the resource areas to indicate a time that an associated operation has been scheduled to be performed using the associated resource. The apparatus also includes indicator generation logic configured to generate a material sufficiency indicator that is displayed within one or more of the material areas to indicate whether or not a sufficient amount of the associated material is available at one or more identified times to meet a demand of the one or more scheduled operations. The apparatus further includes scheduling hint generation logic configured to generate a scheduling hint that is displayed within a material area when an operation identifier has been selected or dragged for scheduling an associated operation within the chart. The scheduling hint identifies one or more portions within the material area for a material as providing either sufficient material or insufficient material for performance of the operation associated with the selected operation identifier.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
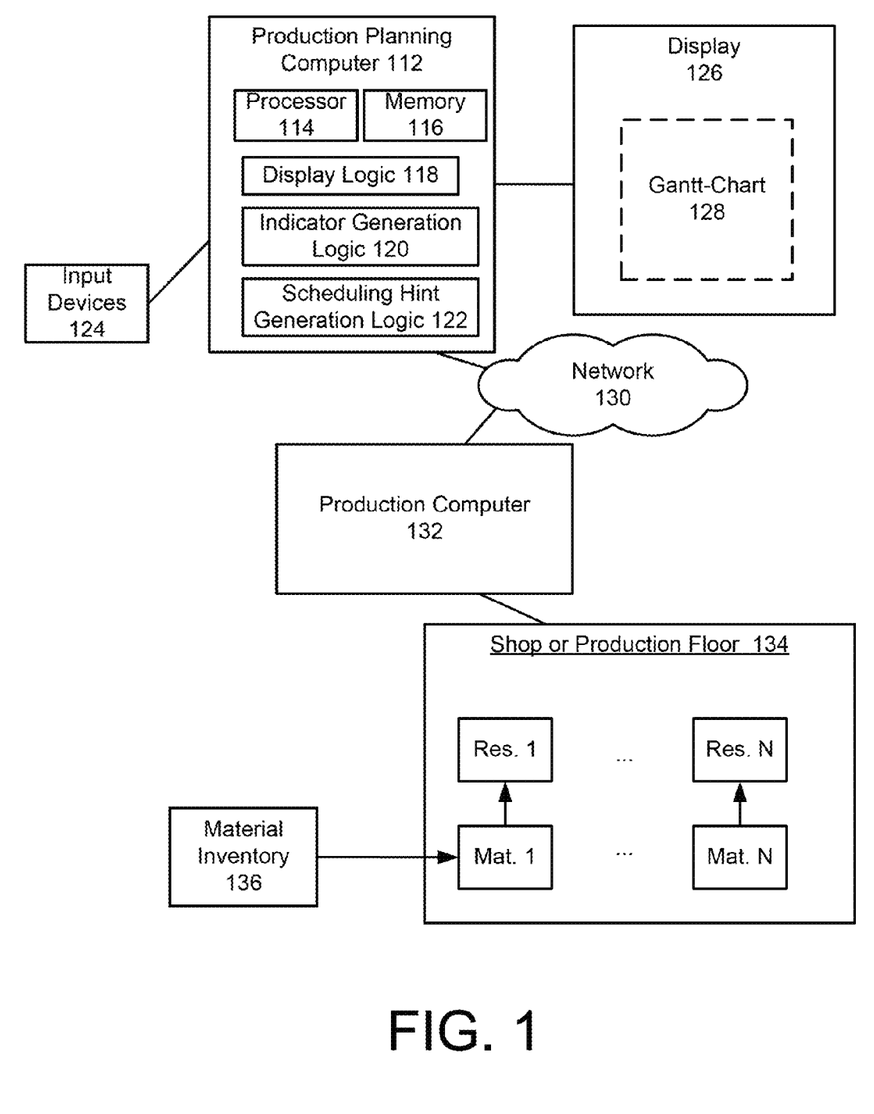
FIG. 1 is a block diagram illustrating an exemplary system in which a chart is displayed including a scheduling hint and a material sufficiency indicator for production planning.

FIG. 1 is a block diagram illustrating an exemplary system in which a chart is displayed including a scheduling hint and a material sufficiency indicator for production planning. A production planning computer 112 may be used for production planning, and may include a processor 114 and memory 116. Input devices 124 may provide input to computer 112, and may include, for example, a keyboard, a mouse, a trackball, a touchpad, or other pointing device or other input device. A display 126 may be connected to production planning computer 112, and may be used to display a chart or graphical planning board, such as a Gantt-chart 128, that may be used to perform detailed scheduling for production planning. In some cases, Gantt-charts may include a bar chart to illustrate a project schedule, and may be used to show how tasks and resources are allocated over time.

Computer 112 may include display logic 118 to display information on display 126, such as a chart (e.g., Gantt-chart) or other information, which may be used for production planning. An indicator generation logic 120 may be provided to generate and display a material sufficiency indicator on the Gantt-chart 128, e.g., to indicate whether or not a sufficient amount of a material is available at one or more identified times to meet a demand of the currently scheduled operations. Indicator generation logic 120 may generate and display on chart 128 other types of indicators, such as a material supply indicator that may identify a supplying of a material from a source or from an output of an operation, and a material demand indicator that may identify demand or usage of material by an operation.

In an example implementation, the material sufficiency indicator may use a first visual indication (e.g., a green colored bar or indication) when a material supply exceeds a threshold, a second visual indicator (e.g., a red colored bar or indication) when material supply is less than the threshold, and a third visual indicator (e.g., transparent, no color, or other color) when material supply meets the threshold. Visual indicators may be different appearances, different colors, etc. The threshold may be, for example, a total amount of the material required by the scheduled operations, for example.

Computer 112 may also include a scheduling hint generation logic 122 to generate and display a scheduling hint when an operation identifier has been selected or dragged for scheduling an associated operation to be performed within chart 128. For example, the scheduling hint may identify one or more portions along a timeline where a material that is used by the selected operation has either sufficient material (e.g., as identified via a first visual indicator or color) or insufficient material, e.g., as indicated by a second visual indicator or color, for performance of the selected operation. Both the material sufficiency indicator and the scheduling hint, for example, may be displayed on chart 128 at the same time and may be used by a production planner or supervisor to plan the allocation of materials and resources to operations.

Also, referring to the system of FIG. 1, a production computer 132 may be coupled to production planning computer 112 via a network 130. Network 130 may be a Local Area Network, the Internet, a Wireless Local Area Network (WLAN), or any network or combination of networks. Production computer 132 may be used to control various aspects of production, e.g., based on the Gantt-chart 128 or other information, for example. Various processes related to production may be performed at a shop or production floor 134, for example. As shown in FIG. 1, several materials, including material 1 (Mat. 1), material 2, ... material N (Mat. N) may be used by various resources (Res. 1, ... Res. N) to produce products or other materials. Materials may come from a material inventory 136, and/or may come from output of previous operations, for example.

According to an example implementation, a process may include one or more operations. An operation may be performed by one or more resources on one or more materials to produce a product. In an example implementation, a material may be anything that may be used, purchased, obtained, procured, received, built, or anything produced or output from a previous operation, and/or which may be used to produce a product, for example. Materials may include, for example, screws, wood blocks, paint, and intermediate products output from a previous operation of a process. These are merely a few simple examples and a material may include a wide variety of materials. A resource may include anything that may be used to perform an operation on one or more materials to produce a product. For example, a resource may include a worker (e.g., machinist), a machine, a tool, etc. A resource may be idle (available), or may be busy, for example. A material (the currently available amount of the material) may be sufficient to perform an operation, or may be insufficient to perform an operation. For example, if 10 screws are needed for an operation, but only 3 screws are available at the beginning of that operation, then there is insufficient material (screws) for that operation to be performed.

In an example implementation, operations may be performed on materials by resources (or by machines/tools/workers) to produce a product. The same material(s) may be used in multiple operations. A process may include multiple operations, where a different resource(s) may be used for each operation of the process, for example. Different processes and different operations may be performed in parallel (or at the same/overlapping time), e.g., by different resources/machines.

In a very simple example, a block of wood (material) may be drilled by a drill (resource or machine) in a first operation, sanded by a sander (a second resource) in a second operation, and painted by a painting machine (a third resource) or sprayer in a third operation. Wood blocks, paint, and the output of the intermediate operations may be considered to be materials. The drill, the sander, the painting machine (or sprayer), and any workers needed to operate these machines may be resources. In this example, there are three operations: operation 1—drilling; operation 2—sanding; operation 3—painting. These are just some very simple illustrative examples of materials, resources, operations and products, and the disclosure is not limited thereto.

Figure 2:
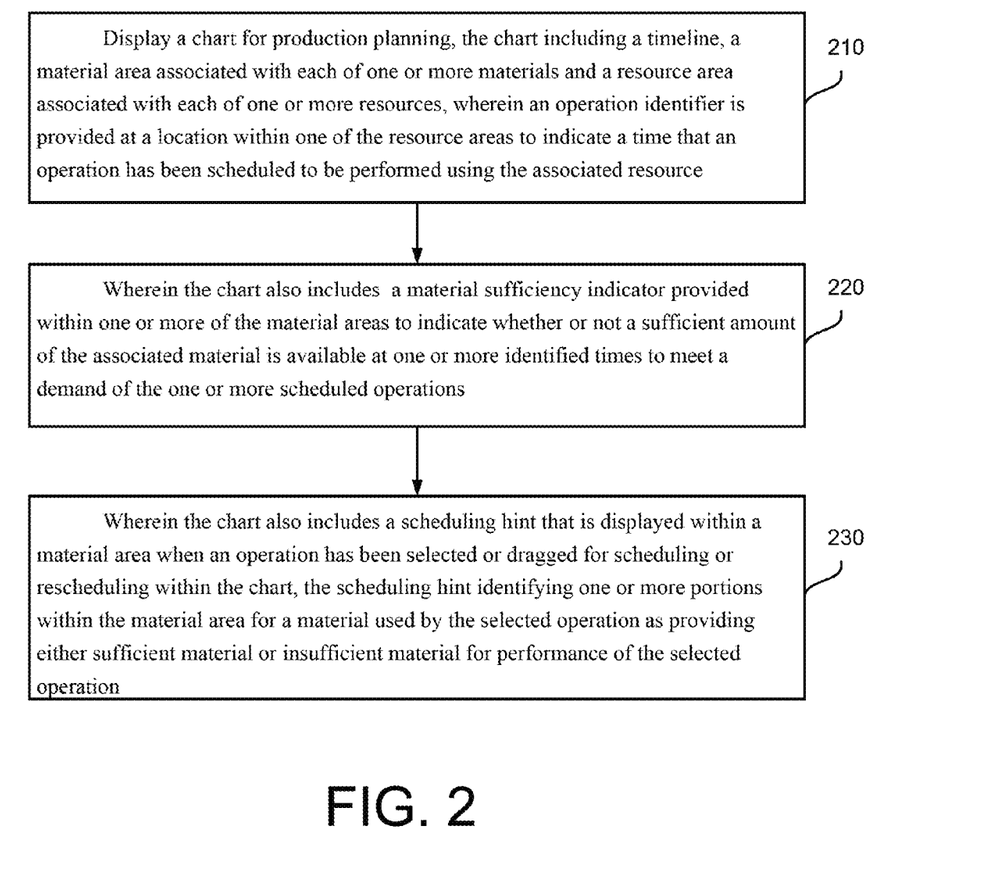
FIG. 2 is a flow chart illustrating a method for displaying a chart for production planning according to an example implementation.

FIG. 2 is a flow chart illustrating a method for displaying a chart for production planning according to an example implementation.

At 210, a chart (e.g., chart 128) for production planning is displayed, e.g., by display logic 118. The chart includes a timeline, a material area associated with each of one or more materials and a resource area associated with each of one or more resources. An operation identifier is provided at a location within one of the resource areas to indicate a time that an associated operation has been scheduled to be performed using the associated resource.

At 220, the chart includes a material sufficiency indicator provided within one or more of the material areas to indicate whether or not a sufficient amount of the associated material is available at one or more identified times to meet a demand of the one or more scheduled operations.

At 230, the chart also includes a scheduling hint that is displayed within a material area when an operation identifier has been selected or dragged for scheduling an associated operation within the chart. The scheduling hint identifies one or more portions within the material area for a material as providing either sufficient material or insufficient material for performance of the operation associated with the selected operation identifier.

In an example implementation, there may be several constraints that a supervisor may observe when performing production planning, such as: 1) a resource should be capable of performing an operation for which it has been scheduled (and the capacity of the resource should not be overloaded); 2) resources and materials should be available fore they are needed for an operation; 3) supply of materials are limited, and a material used for one operation means the material will not be available for use by another operation; 4) if a result (or semi-finished product) output from a first operation will be used as input material to a second operation, then the first operation must be completed or finished, before the second operation can begin; 5) an operation not yet communicated to the shop floor should be scheduled to start in the future.

Scheduling hints may provide a number of advantages. Scheduling hints inform the user that he or she is about to violate a feasibility constraint, while he or she is dragging an operation in the Gantt-chart. Scheduling hints can be very helpful in detailed scheduling for the following reasons: Planners get immediate feedback from the system. Planners are informed about constraint violations while they are still dragging an operation in the Gantt-chart. Planners do not have to drop an operation, wait for the system to compute the consequences of the changed plan, analyze the changed plan, and react to the scheduling problems detected by the system after dropping or scheduling the operation. Therefore, planners can create a feasible plan quicker with scheduling hints. Also, planners are informed about constraint violations without side-effects. Without scheduling hints, planners or supervisors may be required to first drop an operation in a chart or schedule the operation before the system checks constraint violations, according to one example implementation. The planner may then need to undo the dropped operation, which may not be simple. The scheduling hint may provide immediate feedback for a selected operation, without actually dropping or scheduling the operation yet, for example.

Figure 3:
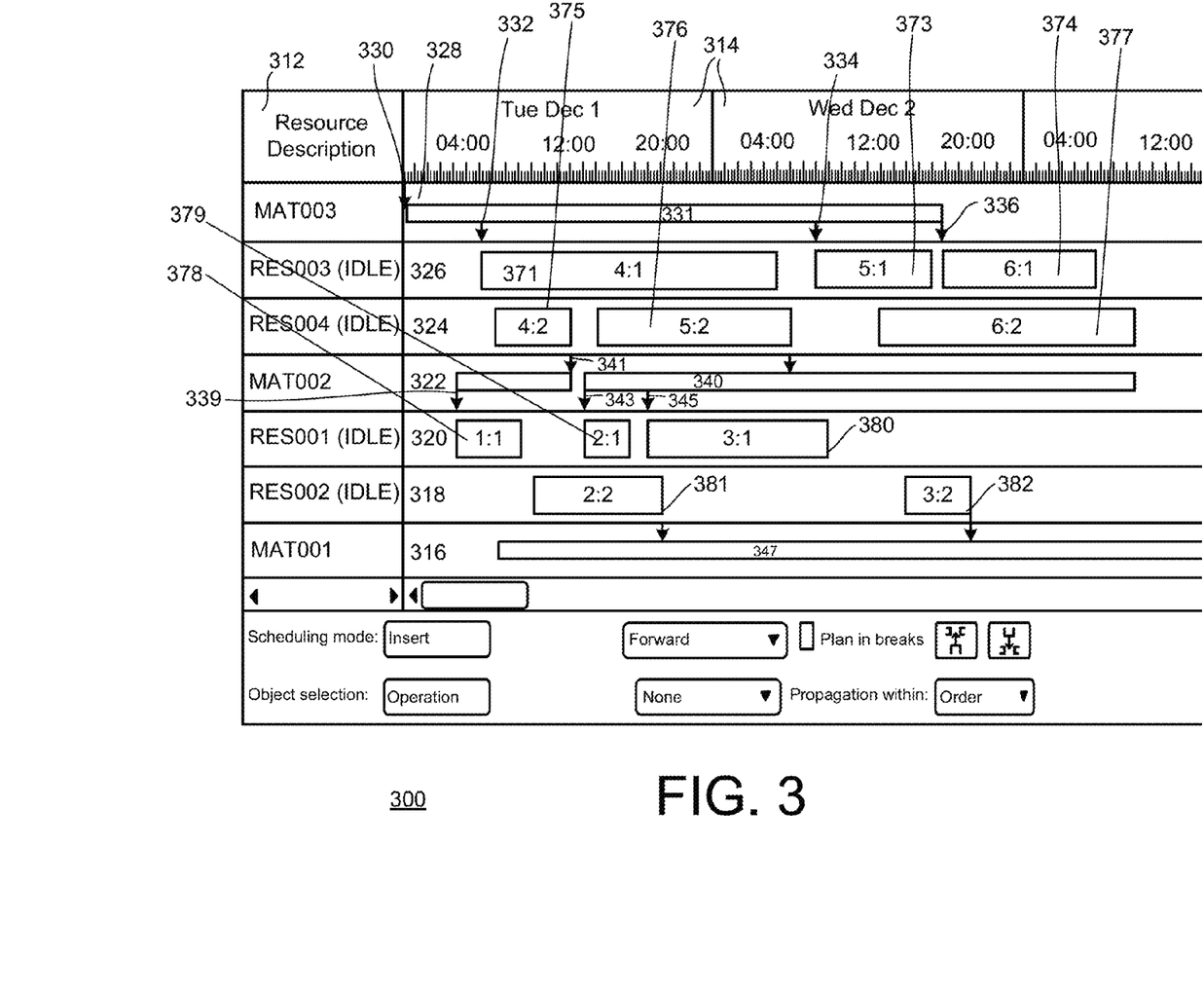
FIG. 3 is a diagram illustrating a chart 300 for production planning according to an example implementation.

FIG. 3 is a diagram illustrating a chart 300 for production planning according to an example implementation. Chart 300, which may be a Gantt-chart or a version of Gantt-chart 128 shown in FIG. 1, is provided in this example as a bar-graph that includes a list of several resources and materials in a first column 312, and a timeline 314 that shows time—24 hours for each of 3 days, December 1, December 2, and December 3. Column 312, having a heading "Resource Description", lists three materials (MAT001, MAT002, MAT003) and four resources (RES001, RES002, RES003 and RES004). A material area may be provided for each material and a resource area may be provided for each resource. In this example chart 300, a material area may be a row in the chart 300 corresponding to the material, and a resource area may be a row in the chart corresponding to a resource, although these are merely examples. For example, row 316 is provided for material MAT001, row 318 is provided for resource RES002, row 320 is provided for resource RES001, row 322 is provided for material MAT002, row 324 is provided for resource RES004, row 326 is provided for resource RES003, and row 328 is provided for material MAT003.

In addition, a user interface (UI) element, such as an operation identifier, may be provided or displayed on chart 300 to indicate or represent that an associated operation has been scheduled within chart 300. In an example implementation, operations may be designated or identified using two numbers separated by a colon, where the first number may identify a process, and the second number may identify an operation of that process. For example, operation 4:1 (provided in row 326) refers to the first operation of the fourth process.

Operation identifiers 371, 373 and 374 are associated with operations 4:1, 5:1 and 6:1, respectively, and indicate that these operations have been scheduled within row or resource area 326. This means that these operations 4:1, 5:1 and 6:1 have been scheduled to be performed using resource RES003 at the times indicated by the associated operation identifiers 371, 373 and 374, respectively. Similarly, operations 4:2, 5:2, and 6:2 are provided within row 324, meaning that these three operations have been scheduled at the indicated times to be performed by the resource associated with row 324 (RES004). Also, operations 4:2, 5:2 and 6:2 are scheduled to be performed by RES004 based on operation identifiers 375, 376 and 377, respectively. Operations 1:1, 2:1 and 3:1 are scheduled to be performed by resource RES001 based on operation identifiers 378, 379 and 380, respectively. Operations 2:2 and 3:2 are scheduled to be performed by resource RES002 based on operation identifiers 381 and 382, respectively.

An operation identifier may be selected (e.g., from a pool of operation identifiers associated with unscheduled operations, not shown, or one of the currently scheduled operations) and dragged and dropped onto a row (or to a new location if already scheduled) for a resource (dropped onto a resource area or row) in order to schedule the performance of the associated operation at the indicated time using the associated resource, e.g., using the resource of the row where the operation has been dropped.

Chart 300 may also identify one or more materials used by (input to), or output from an operation. Material supply indicator 330 identifies a receipt of material for MAT003, e.g., from inventory, or output from another operation, not shown. Material sufficiency indicator 331 is provided within row 328 for material MAT003, and indicates whether there is sufficient material for MAT003 for the scheduled operations. In this example, material sufficiency indicator 331 may be provided using a visual indicator (e.g., any pattern or color), which may be provided as a sub-area (e.g., small bar) within material area or row 328, that indicates whether or not a sufficient amount of material MAT003 is provided at various points along the timeline to allow the scheduled operations (e.g., operations 4:1, 5:1, 6:1, in row 326) to be performed. For example, a green material sufficiency indicator may indicate that a sufficient amount of material is available for the scheduled operations 4:1, 5:1 and 6:1. While a red material sufficiency indicator may indicate that at one or more points or areas along the timeline (where indicator is red), a sufficient amount of MAT003 is not provided (demand for the material exceeds supply when the indicator is red), and thus, this may prevent one or more scheduled operations (which use or rely on the identified material MAT003) from being performed, based on the insufficient amount of MAT003 that is needed by the operation(s).

In this example, based on the supply or receipt of material as indicated by the material supply indicator 330, the material sufficiency indicator 331 for MAT003 is green from a time 0:00 on December 1 up to about time 18:00 on December 2 on the timeline, indicating that a sufficient amount of MAT003 is provided during this period for performance of the scheduled operations 4:1, 5:1, and 6:1. A material demand indicator 332, shown as a line from material sufficiency indicator 331 within row 328 (for material MAT003) to operation 4:1 of row 326 (for resource RES003), indicates that operation 4:1 demands or requires some of material MAT003 at the start of operation 4:1 (at about 06:00, December 1, on timeline 314) to perform operation 4:1. Material demand indicators 334 and 336 similarly identify a demand or requirement of material MAT003 at the start of operations 5:1 and 6:1, respectively, provided on row 326.

In the example chart 300 shown in FIG. 3, material MAT002 may be an output (or intermediate product) from operations 4:2, 5:2 and 6:2. At row 322, material sufficiency indicator 338 is red, indicating that a sufficient amount of material MAT002 is not available for operation 1:1, which requires MAT002 at about time 04:00. Thus, in this example, the material demand indicator 339 (for operation 1:1) occurs before the first material supply indicator 341 (from operation 4:2, row 324), which results in a shortage or insufficient amount of MAT002. Material sufficiency indicator 340 is also red, which indicates that material MAT002 is not sufficient to meet the needs or requirements of operation 2:1 (via material demand indicator 343) and operation 3:1 (via material demand indicator 345).

Apparently, in this example of FIG. 3, the amount of material MAT002 output by operation 4:2 via material supply indicator 341 was not sufficient to meet the demands of operations 2:1 and 3:1, hence, material sufficiency indicator 340 is red, which indicates the production plan as shown is not feasible for operations 1:1, 2:1 and 3:1. This may indicate to the supervisor that, for example, operations 1:1, 2:1 and/or 3:1 may need to be delayed until a later time when a larger amount of MAT002 is available (e.g., possibly until after end of operation 6:2, where red material sufficiency indicator 340 ends). Or, the current set of operations 1:1, 2:1 and 3:1 may be maintained if an additional amount of material MAT002 is supplied or provided earlier in time for operations 1:1, 2:1 and 3:1.

Also, material sufficiency indicator 347 is green (e.g., since no operations require material from MAT001 yet), and indicator 347 of MAT001 receive output/supply of MAT001 from operations 2:2 and 3:2 in row 318.

Figure 4:
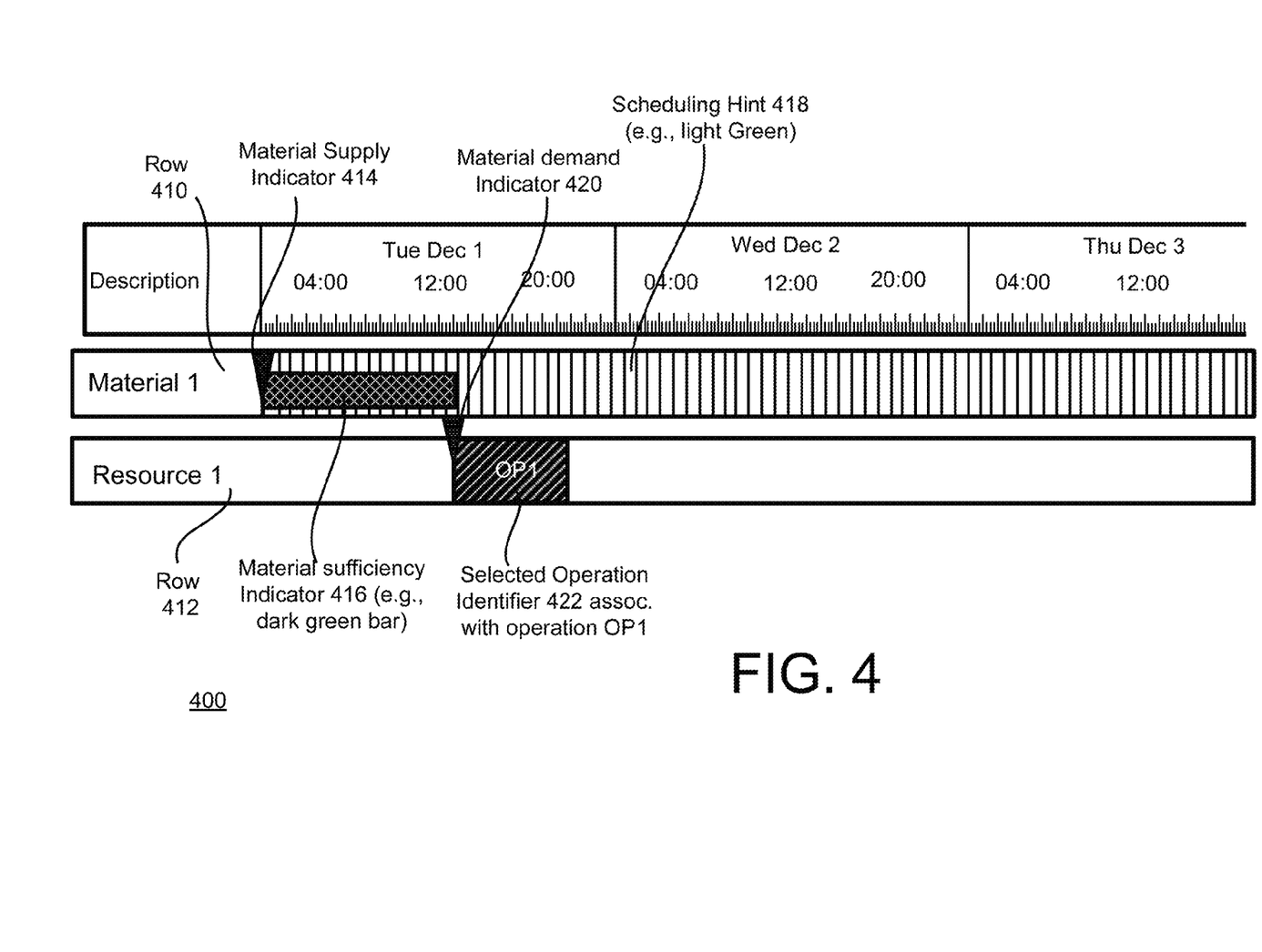
FIG. 4 is a diagram illustrating a chart 400 for production planning according to another example implementation in which sufficient material is provided for performing an operation.

FIG. 4 is a diagram illustrating a chart 400 for production planning according to another example implementation in which sufficient material is provided for performing an operation. Chart illustrates a row 410 for material 1, and a row 412 for resource 1. A material supply indicator 414 indicates that material 1 is supplied at time 0:00. A material demand indicator (e.g., arrow from row 410 to operation 422) 420 indicates that material 1 is required by operation op 1 422 at about 12:00. Operation (op 1) 422 is provided within row 412, beginning at around 12:00, which indicates that operation op 1 422 is performed by resource 1 beginning at 12:00. A green material sufficiency indicator 416, which may be provided as a sub-area within row 410 (e.g., dark green bar within the row 410) indicates that a sufficient amount of material 1 is provided for all of the currently scheduled operation(s) (supply exceeds demand for the material based on the currently scheduled operations and current material supply), where the indicator 416 is green.

Therefore, in general, a material sufficiency indicator may use a first visual indicator (e.g., dark green bar) within a material area (or row for a material) to indicate that material supply is greater than (or greater than or equal to) the material demand based on the currently scheduled operations, and a second visual indicator (e.g., dark red bar) within a material area (or row for a material) to indicate that the material demand is greater than the material supply for the noted time(s) on the chart. A third color (or third visual indicator), which may be an actual color, or may be an absence of either of the first two colors (e.g., third color may be clear, or no bar) to indicate that material supply exactly meets material demand, according to one example implementation.

As shown in FIG. 4, in response to a user or supervisor selecting or dragging operation identifier 422 for operation op 1, a scheduling hint 418 may be displayed (e.g., light green color is provided for row 410) to indicate that a sufficient amount of material 1 is available for the operation OP1 to be performed that is associated with the operation identifier 422. The dark green bar of material sufficiency indicator 416 is provided as a sub-area within row 410 and is separately viewable within row 410. The light green scheduling hint 418 may, for example, be displayed only while the operation identifier 422 is selected or dragged for scheduling operation OP1, and the scheduling hint 418 identifies one or more portions within a material area (e.g., within row 410 for material 1) for the material used by the selected operation (material 1) as providing either sufficient (e.g., as light green scheduling hint) or insufficient material (e.g., as a light red hint within a row) for performance of the operation associated with the selected operation identifier 422. Thus, while red and green colored scheduling hints are used in this example, in general, different visual indicators may be used for different scheduling hints, e.g., different patterns, colors or other indications may be used to identify sufficient or insufficient material for performance of the selected operation. In this example, if desired, the selected operation identifier 422 may be moved back, e.g., back to time 0:00 where the scheduling hint 418 is first light green (or, more generally, where the scheduling hint 418 first indicates that a sufficient amount of material 1 is provided for performance of the operation OP1 associated with the selected operation identifier 422). A light red color may be used (or other visual indication), for example, for a scheduling hint to indicate insufficient material for the selected operation. In this manner, scheduling hint 418 may provide a hint or some guidance to the user or supervisor that is scheduling or rescheduling operations within chart 400.

Thus, the material sufficiency indicator 416 may be considered a static indicator (e.g., always continuously displayed, regardless whether one or more operations or operation identifiers may be selected) and is based on all currently scheduled operations, for example. According to one example implementation, the scheduling hint 418 may be considered a dynamic (or temporary) indicator since it is displayed only (or temporarily) while an operation identifier or operation is selected (or dragged), e.g., for scheduling or rescheduling, and indicates sufficiency of material 1 only with respect to the operation associated with the selected operation identifier 422.

Figure 5:
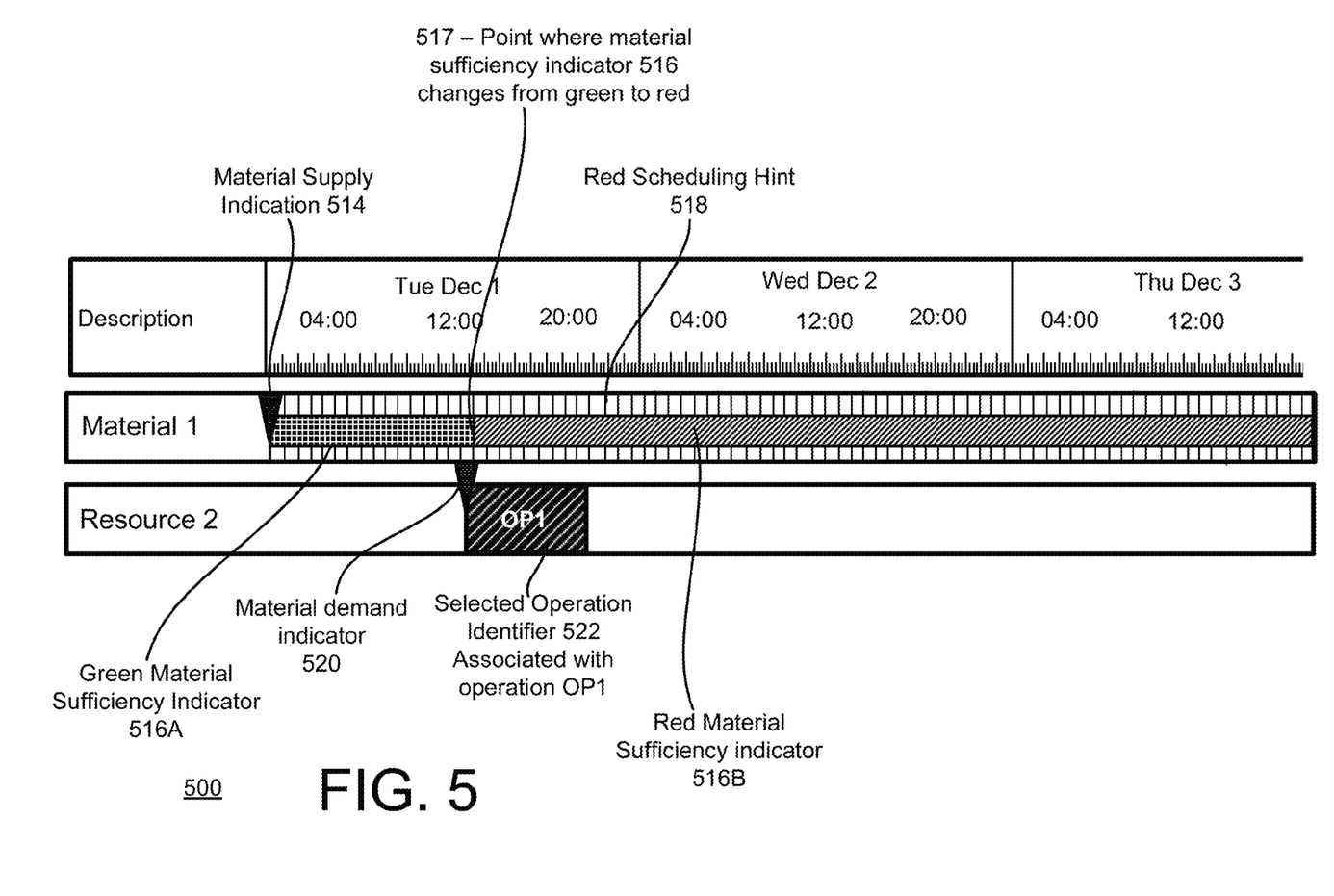
FIG. 5 is a diagram illustrating a chart 500 for production planning according to another example implementation.

FIG. 5 is a diagram illustrating a chart 500 for production planning according to another example implementation. A material supply indicator 514 indicates that material 1 is supplied (e.g., from inventory or another operation) at time 0:00, although the amount of material supplied is not stated in this example (the amount of material supplied or remaining may be stated or indicated). A green material sufficiency indicator 516A from time 0:00 to time 12:00 or 13:00 indicates that sufficient material 1 is provided for all operations scheduled during this period of time. This is because there are no operations scheduled during this period of time that use or require material 1 for operation. At time 12:00 or 13:00, a material demand indicator 520 indicates that the operation OP1 associated with operation identifier 522 requires some of material 1. Thus, at point 517, the material sufficiency indicator 516 turns from dark green (516A) to dark red (516B), based on the material demand indicator 520 resulting from operation OP1 associated with operation identifier 522. Thus, while there is some available material 1, the red material sufficiency indicator 516B beginning at time 12:00 (when the operation associated with operation identifier 522 begins) indicates that the amount of available material 1 is not sufficient to meet the demands of operation OP1 associated with operation identifier 522. When the operation identifier 522 is selected, the red scheduling hint 518 is displayed throughout the entire row for material 1, which indicates that material 1 is never provided in sufficient quantity for these three days (December 1-3) for the operation OP1 associated with operation identifier 522 to be performed. For example, material 1 may be screws, and 3 screws may have been obtained at 0:00 (indicator 514), while operation OP1 associated with operation identifier 522 may require 8 screws. Thus, unless additional screws (material 1) is obtained, there is no location where the operation associated with operation identifier 522 can be scheduled where it would receive sufficient quantity of screws/material 1.

Figure 6:
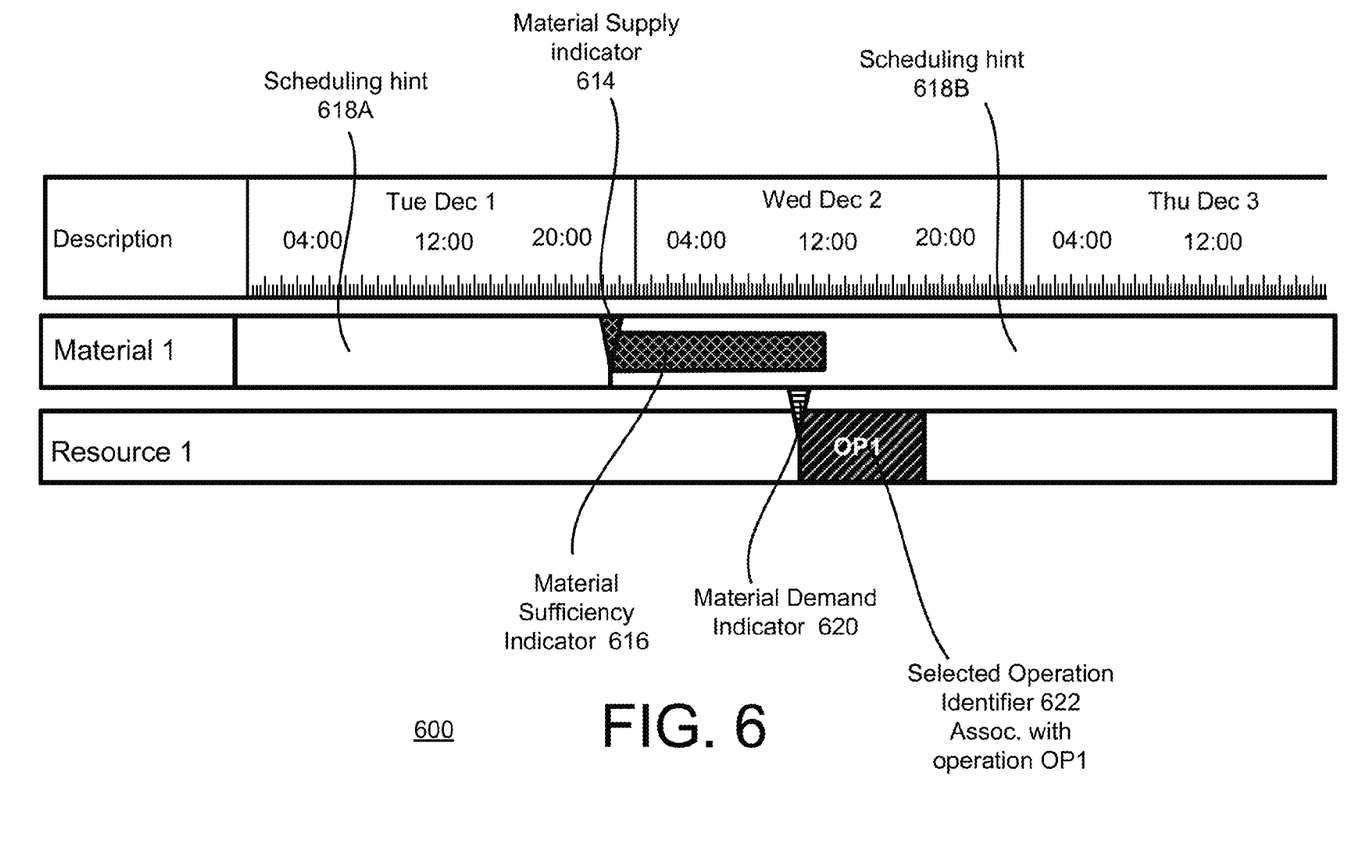
FIG. 6 is a diagram illustrating a chart 600 for production planning according to another example implementation.

FIG. 6 is a diagram illustrating a chart 600 for production planning according to another example implementation. A supply of material 1 is received at about 23:00 on December 1, as indicated by material supply indicator 614. An operation OP1 associated with operation identifier 622 is scheduled to be performed, as shown by operation identifier 622, beginning at about 10:00 on December 2, and requires some of material 1, as indicated by material demand indicator 620. Prior to material supply indicator 614, the supply of material 1 (which is zero, or no supply prior to indicator 614) is equal to the demand of material 1 (which is zero or no demand for material 1, prior to operation identifier 622), and thus, there is no material sufficiency indicator prior to material sufficiency indicator 616. Or, in other words, or in another example implementation, a clear (or a third color) of a material sufficiency indicator (e.g., clear) may be used where supply and demand of a material are equal, based on scheduled operations.

At about 23:00 on December 1, a green material sufficiency indicator 616 is provided, based on a supply of material 1 being greater than the then current demand for material 1 (there is no demand for material 1 until operation OP1 associated with operation identifier 622, hence the green indicator 616 indicates excess supply of material 1).

When a user selects the operation identifier 622, scheduling hints 618A and 618B are displayed, where a transition between 618A and 618B is at time 23:00 of December 1. Scheduling hint 618A is light red in this example, indicating insufficient material 1 for performing the operation OP1 associated with selected operation identifier 622 during this period, and hence, the operation associated with operation identifier 622 should not be scheduled during the period where scheduling hint 618A is red. After receipt of material 1 via material supply indicator 614, the scheduling hint 618A turns green at 618B, indicating that sufficient material 1 is provided during this green scheduling hint 618B (e.g., beginning at indicator 614 and later for operation OP1 associated with selected operation identifier 622). Thus, the start of operation OP1 associated with operation identifier 622 may be scheduled anywhere within the time indicated by the light green scheduling hint 618B, according to this example implementation.

Figure 7:
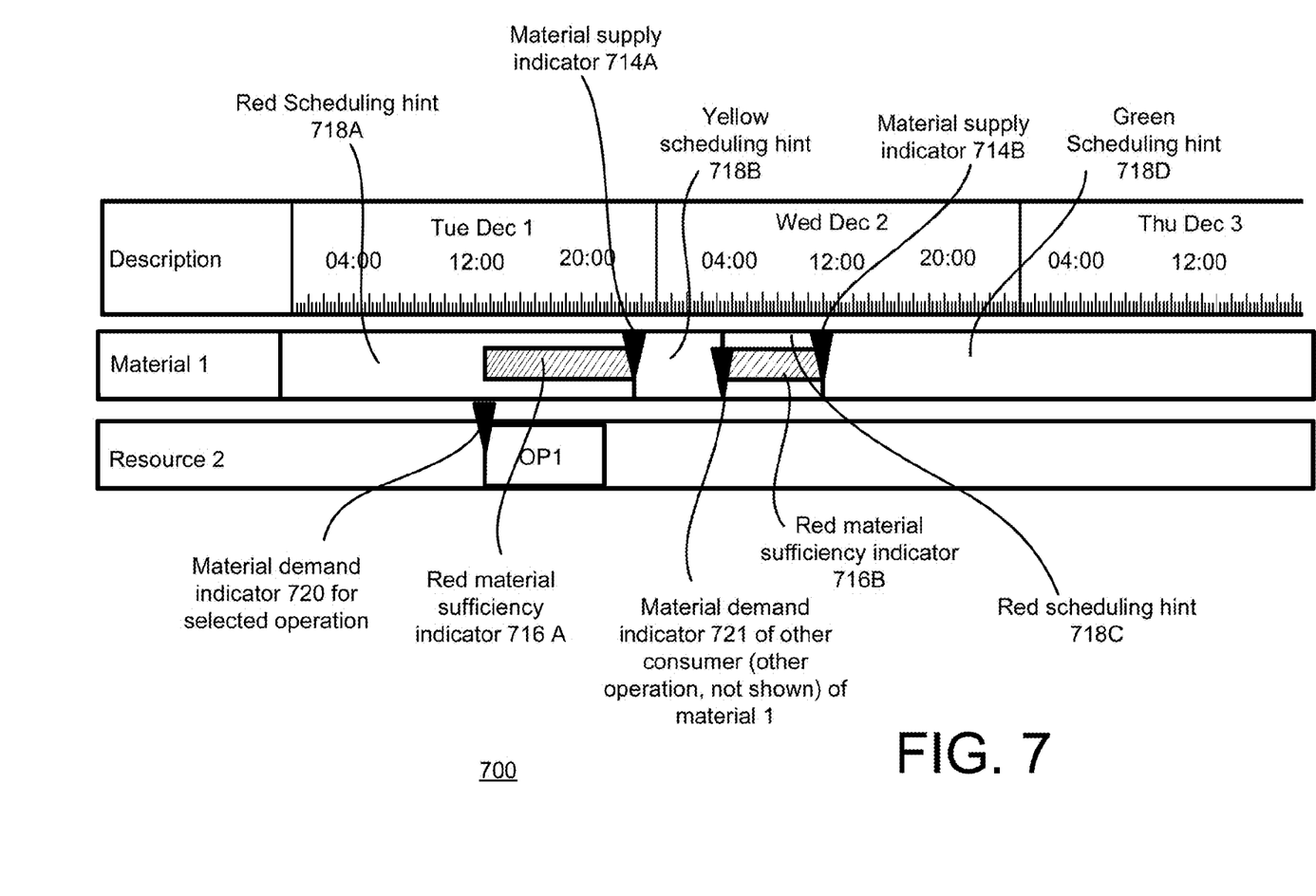
FIG. 7 is a diagram illustrating a chart 700 for production planning according to another example implementation where an example of material stealing is illustrated.

FIG. 7 is a diagram illustrating a chart 700 for production planning according to another example implementation where material stealing is illustrated. An operation OP1 associated with operation identifier 722 using material 1 may be performed and requires material 1. Red material sufficiency indicators 716A and 716B indicate areas where insufficient material 1 is provided based on all scheduled operations. A material demand indicator 720 is shown for the operation OP1 associated with the operation identifier 722. Another material demand indicator 721 is shown for another operation (not shown) or another consumer of material 1. Thus, both operation 1 (OP1), and one or more additional operations (not shown) require material 1 in this example. This example assumes that at least a second operation (not shown) is scheduled to occur, e.g., during indicator 716B. Additional material 1 is supplied at points shown as material supply indicators 714A (a first material supply) and 714B (a second material supply).

According to this example, when operation identifier 722, associated with operation OP1, is selected, three different portions of a scheduling hint 718 are temporarily displayed, including a red scheduling hint 718A, a yellow scheduling hint 718B and a green scheduling hint (or scheduling hints that may use first, second and third visual indicators, which may be different patterns, colors or other visual indicators, for example). The red scheduling hints 718A, 718C indicate that material 1 for selected operation identifier 722 will not be sufficiently available anytime before first material supply at indicator 714A (based on hint 718A), nor during material sufficiency indicator 716B (based on hint 718C) to perform the operation OP1 associated with the selected operation identifier 722. The green scheduling hint 718D indicates the material 1 used by the operation OP1 associate with the operation identifier 722 will be sufficiently available anytime after the second material supply at indicator 714B.

In addition, the yellow scheduling hint 718B indicates that material 1 for the selected operation identifier 722 will be available in a sufficient quantity to perform the operation OP1 associated with the operation identifier 722, but only at the expense of another operation, or another consumer, that is currently scheduled to be performed and use material 1. This option may be referred to as material stealing, where material currently allocated for one scheduled operation is stolen or re-allocated to another operation, e.g., material 1 is stolen in this example and re-allocated to operation OP1 associated with selected operation identifier 722. Thus, while operation OP1 associated with selected operation identifier 722 may be scheduled to be performed during the yellow scheduling hint 718B, this will result in another scheduled operation (not shown) that occurs later in time in not having a sufficient amount of material 1 (based on the stealing of material from the other operation), thus requiring rescheduling of this other operation.

Figure 8:
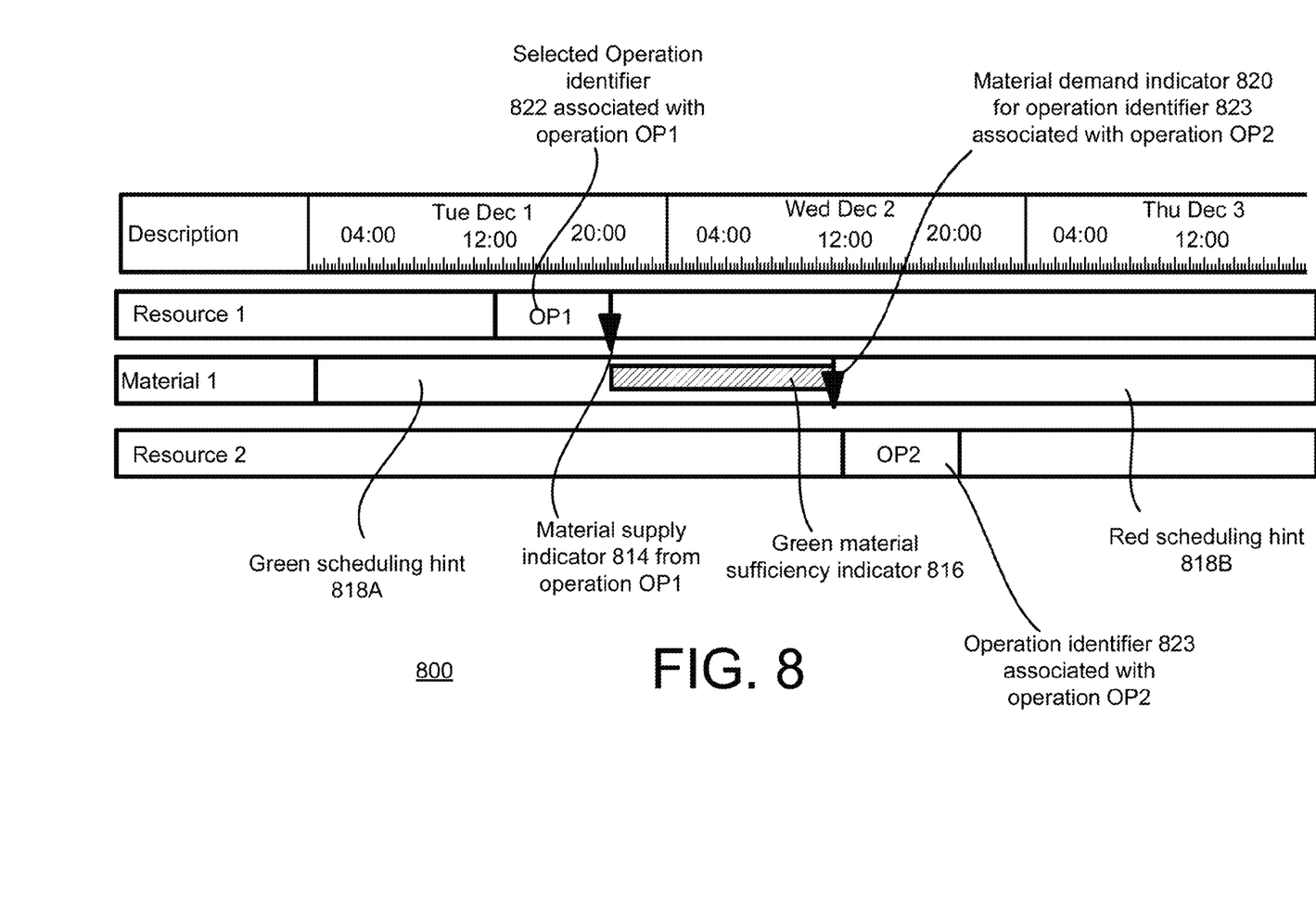
FIG. 8 is a diagram illustrating a chart 800 for production planning according to another example implementation.

FIG. 8 is a diagram illustrating a chart 800 for production planning according to another example implementation. In this example, there are two operations shown. An operation OP1 is associated with a selected operation identifier 822 (which may be selected by a mouse, or other pointing device for moving, scheduling or rescheduling the associated operation OP1 for example), and an additional operation OP2 associated with operation identifier 823, both use material 1.

Green material sufficiency indicator 816 indicates that material 1 will be available in sufficient quantities (supply greater than total demand) during this period. A material supply indicator 814 indicates when material 1, output from operation 1 or OP1, is output and made available for use by other operations. Material demand indicator 820 for operation OP2 associated with operation identifier 823 indicates when operation OP2 requires or demands some of material 1.

Scheduling hints 818, including scheduling hints 818A and 818B, are also shown in FIG. 8. Green scheduling hint 818A indicates that the operation OP1 associated with selected operation identifier 822 may be scheduled anytime during this green scheduling hint 818A, since sufficient material 1 is available for operation 822 during this period. Thus, the operation OP1 associated with selected operation identifier 822 will be performed on this due date, as scheduled, if the this operation is scheduled during green scheduling hint 818A. The red scheduling hint 818B indicates that insufficient material 1 is not provided for selected operation OP1 associated with selected operation identifier 822 during red scheduling hint 818B. Thus, the operation OP1 associated with selected operation identifier 822 will not be performed on the scheduled due date (date will be missed for the operation) if the operation OP1 is scheduled to be performed during the red scheduling hint 818B. This is because, for example, operation OP2 associated with operation identifier 823 uses or consumes some of material 1, leaving insufficient remaining material 1 for operation OP1 of operation identifier 822 to be performed during the red scheduling hint 818B.

Figure 9:
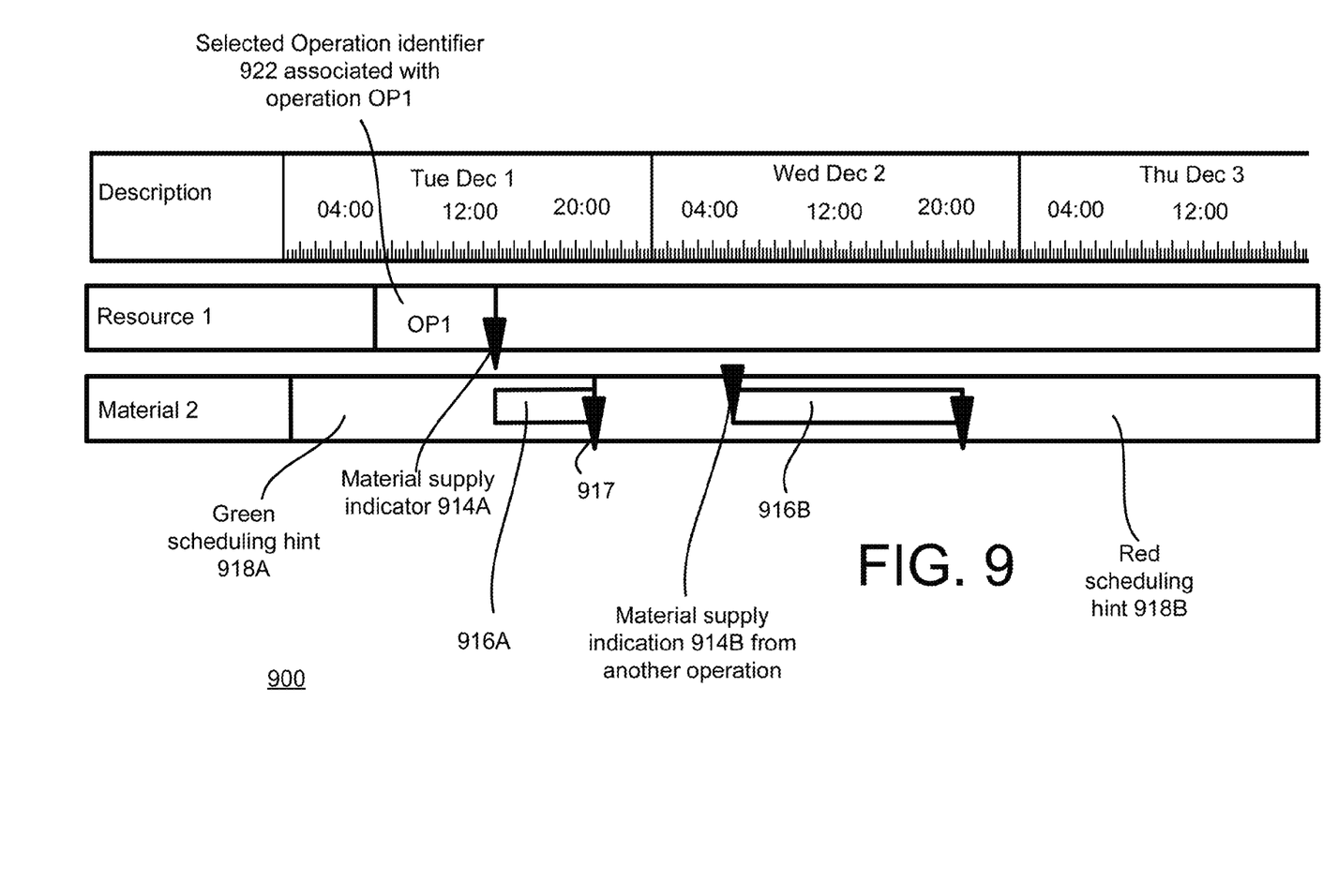
FIG. 9 is a diagram illustrating a chart 900 for production planning according to another example implementation.

FIG. 9 is a diagram illustrating a chart 900 for production planning according to another example implementation. In the example of FIG. 9, the operation OP1 associated with the selected operation identifier 922 produces (as an output) a sufficient amount of material 1 required by several additional operations. Selected operation OP1 is performed, and may output some material 1, as shown by material supply indicator 914A. Another operation (not shown) may also output material 1 at material supply indicator 914B. Therefore, the amount of material 1 exceeds the demand for material 1 at areas shown by the green material sufficiency indicators 916A and 916B.

While operation OP1 associated with operation identifier 922 is selected, a green scheduling hint 918A indicates an area where the operation identifier 922 associated with operation OP1 may be scheduled to allow the operation OP1 to be performed on the date/time scheduled. For example, scheduling operation OP1, associated with operation identifier 922, at a time after the end of green scheduling hint 918A (e.g., after indicator 917) may result in insufficient material 1 for operation OP1, due to demand of material 1 by another operation via material demand indicator 917. While some additional supply of material 1 is received from another operation (not shown) via supply indicator 914B, this additional material 1 apparently is insufficient for selected operation OP 1 associated with operation identifier 922, based on red scheduling hint 918B. For example, 3 screws may be received at indicator 914B, while operation OP1 associated with operation identifier 922 may need 8 screws, resulting in scheduling hint 918B being red, indicating insufficient material 1 for the selected operation, OP1) in this example.

Figure 10:
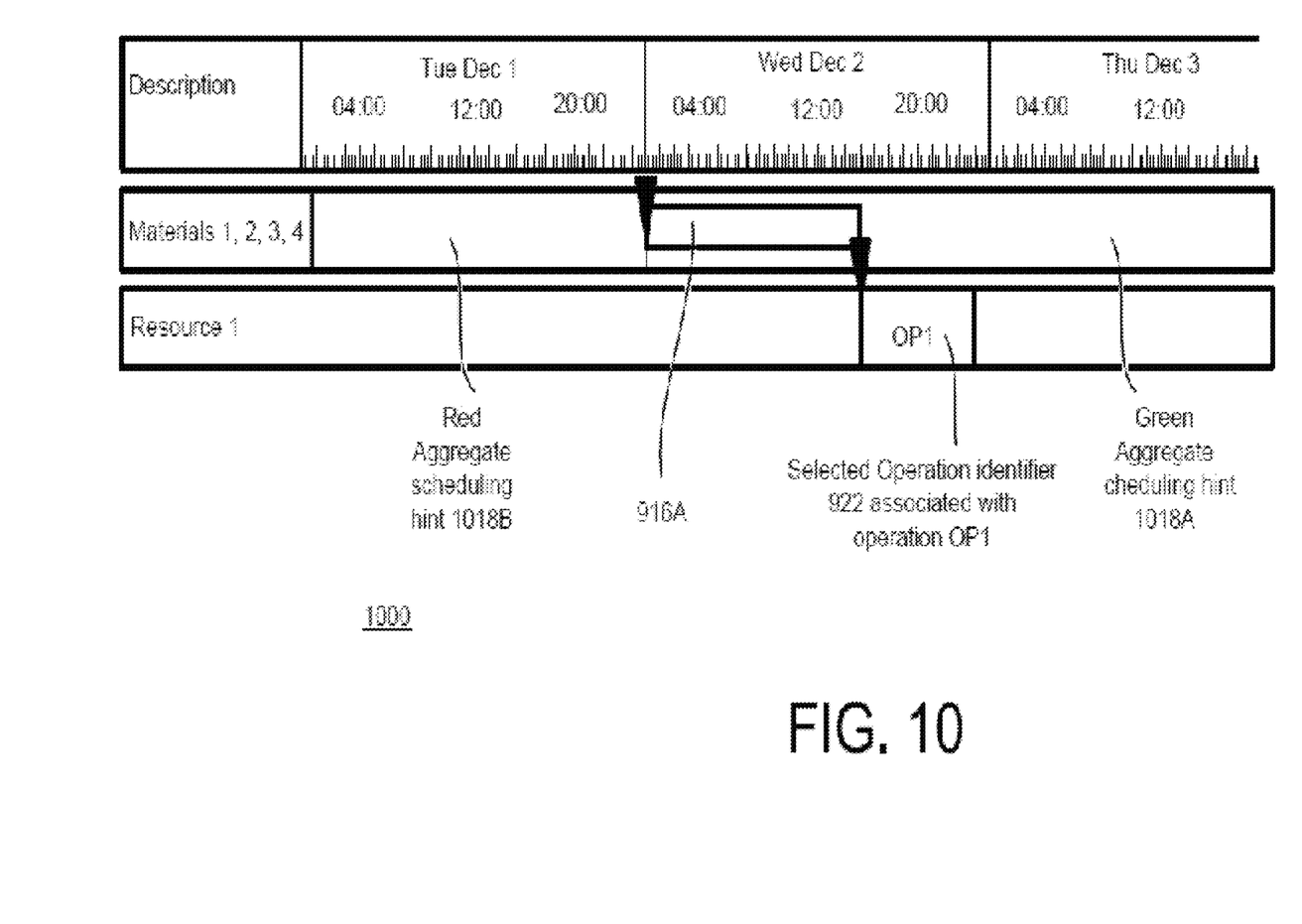
FIG. 10 is a diagram illustrating a chart 1000 for production planning according to another example implementation that includes an aggregate scheduling hint.

FIG. 10 is a diagram illustrating a chart 1000 for production planning according to another example implementation that includes an aggregate scheduling hint. In some cases, multiple materials may be required for an operation to be performed. Therefore, rather than providing a scheduling hint for each of one or more specific materials, an aggregate scheduling hint(s) may be provided or displayed to identify sufficiency of materials for multiple materials used by an operation associated with the selected operation identifier. In an example implementation, an aggregate scheduling hint may be displayed on the chart when an operation identifier has been selected or dragged for scheduling an associated operation within the chart. As shown in FIG. 10, the operation identifier 922 has been selected for scheduling operation OP1, which causes aggregate scheduling hints 1018A, 1018B to be displayed.

In one example implementation, the aggregate scheduling hint uses a first visual indicator (e.g., color green or other indicator) to identify where a sufficient amount is provided for a plurality of (or even all) materials required for performance of the operation associated with the selected operation identifier. For example, as shown in FIG. 10, a green aggregate scheduling hint 1018A is green to indicate that sufficient amount of all of materials 1, 2, 3 and 4 are available to allow operation OP1 to be performed anytime later than 0:00 on Wednesday December 2. These may be all of the materials required for OP1, or there may be one or more additional required materials. Thus, operation OP1 (having an associated operation identifier 922) may be scheduled or rescheduled to any point that overlaps the green aggregate scheduling hint 1018A.

Similarly, an aggregate scheduling hint may use a second visual indicator to identify where a sufficient amount is not provided for at least one of a plurality of materials required for performance of the operation associated with the selected operation identifier. Thus, as shown in FIG. 10, a red aggregate scheduling hint 1018B indicates that there is an insufficient amount of at least one of materials 1, 2, 3, or 4. For example, if there is a sufficient amount of materials 1, 2 and 3, but an insufficient amount of material 4, a red aggregate scheduling hint 1018B may be displayed to indicate insufficiency of at least one of the required materials for the selected operation. Therefore, based on aggregate scheduling hint 1018B, the user or planner is notified that operation OP1 should not be scheduled to overlap with the red aggregate scheduling hint, since an insufficiency of at least one required material occurs during that period identified by aggregate scheduling hint 1018B. Thus, the use of an aggregate scheduling hint may provide a more efficient scheduling here, e.g., where multiple materials are required to perform an operation.

Implementations of the various techniques described herein may be implemented in digital electronic circuitry, or in computer hardware, firmware, software, or in combinations of them. Implementations may implemented as a computer program product, i.e., a computer program embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being embodied on a non-transitory computer-readable storage medium and including executable code that, when executed, is configured to cause at least one data processing apparatus to:
    display a chart for production planning, the chart including a timeline, a material area associated with each of one or more materials and a resource area associated with each of one or more resources, wherein an operation identifier is provided at a location within one of the resource areas to indicate a time that a first operation has been scheduled to be performed using the associated resource;
    wherein the displayed chart also includes a material stealing indicator, displayed within a material area for a first material, that indicates that a sufficient amount of the first material is available to perform the first operation only if some of the first material is re-allocated from a second operation to the first operation.

2. The computer program product of claim 1 wherein the chart comprises a Gantt-chart, wherein each material area associated with each of one or more materials comprises a row in the Gantt-chart and each resource area associated with each of one or more resources comprises a row in the Gantt-chart.

3. The computer program product of claim 1 wherein the displayed chart further comprises:
    a material sufficiency indicator provided within one or more of the material areas to indicate whether or not a sufficient amount of the associated material is available at one or more identified times to meet a demand of one or more scheduled operations; and
    a scheduling hint that is displayed within a material area when a selected operation identifier has been selected or dragged for scheduling an associated operation within the chart, the scheduling hint identifying one or more portions within the material area for a material as providing either sufficient material or insufficient material for performance of the operation associated with the selected operation identifier.

4. The computer program product of claim 3 wherein the chart comprises a Gantt-chart, wherein each material area associated with each of one or more materials and each resource area associated with each of one or more resources comprises a row in the Gantt-chart;
    wherein the scheduling hint, provided as a colored area within the material area, is temporarily displayed within a material area only when a selected operation identifier has been selected or dragged for scheduling an associated operation, and having a color indicating one or more portions within the material area for a material as providing either sufficient material or insufficient material for performance of the operation associated with the selected operation identifier; and
    wherein the material sufficiency indicator, provided as a colored sub-area within the material area, having a color indicating whether or not a sufficient amount of the associated material is available at one or more identified times to meet a demand of the scheduled operations.

5. The computer program product of claim 1 wherein performing the first operation using the material causes the second operation to be delayed based on a re-allocation of some of the material from the second operation to the first operation.

6. The computer program product of claim 3 wherein the material sufficiency indicator uses a first visual indicator to indicate that a sufficient amount of the associated material is available meet a demand of the scheduled operation(s), and wherein the material sufficiency indicator uses a second visual indicator to indicate that a sufficient amount of the associated material is not available meet a demand of the scheduled operation(s).

7. The computer program product of claim 3 wherein the material sufficiency indicator uses a first color within the material area to indicate that a material demand exceeds a material supply, and a second color within the material area to indicate that the material supply exceeds the material demand, based on the scheduled operation(s).

8. The computer program product of claim 7 wherein the material sufficiency indicator uses a third color, or absence of the first and second colors, within the material area to indicate that the material supply meets exactly the material demand at that time.

9. The computer program product of claim 3 wherein the scheduling hint is displayed within a material area only when a selected operation identifier has been selected or dragged for scheduling an associated operation within the chart, the scheduling hint uses a first visual indicator to indicate one or more portions of the material area as providing sufficient material for performance of the operation associated with the selected operation identifier, and uses a second visual indicator to indicate one or more portions of the material area as not providing sufficient material for performance of the operation associated with the selected operation identifier.

10. The computer program product of claim 9 wherein the scheduling hint uses a first color to indicate one or more portions of the material area as providing sufficient material for performance of the operation associated with the selected operation identifier, and uses a second color to indicate one or more portions of the material area as not providing sufficient material for performance of the operation associated with the selected operation identifier.

11. The computer program product of claim 3 wherein the scheduling hint also identifies a material stealing option for scheduling the operation associated with the selected operation identifier where at least one portion of the material area would provide sufficient material for performance of the operation associated with the selected operation identifier, but only at an expense of another operation that has been scheduled to use or consume the material later in time.

12. The computer program product of claim 3 wherein the scheduling hint comprises an aggregate scheduling hint for multiple materials used by the operation associated with the selected operation identifier.

13. The computer program product of claim 3 wherein the scheduling hint comprises an aggregate scheduling hint, wherein the aggregate scheduling hint is displayed on the chart when a selected operation identifier has been selected or dragged for scheduling an associated operation within the chart;
  wherein the aggregate scheduling hint uses a first visual indicator to identify where a sufficient amount is provided for all materials required for performance of the operation associated with the selected operation identifier; and
  wherein the aggregate scheduling hint uses a second visual indicator to identify where a sufficient amount is not provided for at least one of the materials required for performance of the operation associated with the selected operation identifier.

14. The computer program product of claim 1 wherein the chart also comprises a material supply indicator connected to a material area that identifies supplying of a material associated with the material area from a source or from an output of an operation to the material area.

15. The computer program product of claim 1 wherein the chart also comprises a material demand indicator that identifies demand or usage of a material by an operation, wherein the material demand indicator is provided between a material area for the material and an operation identifier provided at a location within one of the resource areas.

16. A computer implemented method performed by a processor, the method comprising:
  displaying a chart for production planning, the chart including a timeline, a material area associated with each of one or more materials and a resource area associated with each of one or more resources, wherein an operation identifier is provided at a location within one of the resource areas to indicate a time that a first operation has been scheduled to be performed using the associated resource;
  wherein the displayed chart also includes a material stealing indicator, displayed within a material area for a first material, that indicates that a sufficient amount of the first material is available to perform the first operation only if some of the first material is re-allocated from a second operation to the first operation.

17. The computer implemented method of claim 16 wherein the displayed chart further comprises:
  a material sufficiency indicator provided within one or more of the material areas to indicate whether or not a sufficient amount of the associated material is available at one or more identified times to meet a demand of the one or more scheduled operations; and
  a scheduling hint that is displayed within a material area when a selected operation identifier has been selected or dragged for scheduling an associated operation within the chart, the scheduling hint identifying one or more portions within the material area for a material as providing either sufficient material or insufficient material for performance of the operation associated with the selected operation identifier.

18. The computer implemented method of claim 17 wherein the material sufficiency indicator uses a first color within the material area to indicate that a material demand exceeds a material supply, and a second color within the material area to indicate that the material supply exceeds the material demand, based on the scheduled operations.

19. The computer implemented method of claim 18 wherein the material sufficiency indicator uses a third color, or absence of the first and second colors, within the material area to indicate that the material supply meets exactly the material demand at that time.

20. The computer implemented method of claim 17 wherein the scheduling hint is displayed within a material area only when a selected operation identifier has been selected or dragged for scheduling an associated operation within the chart, the scheduling hint uses a first visual indicator to indicate one or more portions of the material area as providing sufficient material for performance of the operation associated with the selected operation identifier, and uses a second visual indicator to indicate one or more portions of the material area as not providing sufficient material for performance of the operation associated with the selected operation identifier.

21. The computer implemented method of claim 17 wherein the scheduling hint comprises an aggregate scheduling hint for multiple materials used by the operation associated with the selected operation identifier.

22. A computer implemented method performed by a processor, the method comprising:
  displaying a chart for production planning, the chart including a timeline, a material area associated with a material and a resource area associated with a resource, wherein an operation identifier for an operation is provided at a location within the resource area to indicate a time with respect to the timeline that the operation has been scheduled to be performed using the resource;
  wherein the displayed chart also includes a material demand indicator provided between the material area and a start of the operation to indicate that the operation demands or requires some of the material at the start of the operation with respect to the timeline.

23. The computer implemented method of claim 22 wherein the displayed chart further comprises:
- a material sufficiency indicator provided within one or more of the material areas to indicate whether or not a sufficient amount of the associated material is available at one or more identified times to meet a demand of the one or more scheduled operations; and
- a scheduling hint that is displayed within a material area when a selected operation identifier has been selected or dragged for scheduling an associated operation within the chart, the scheduling hint identifying one or more portions within the material area for a material as providing either sufficient material or insufficient material for performance of the operation associated with the selected operation identifier.

24. The computer implemented method of claim 22 wherein the material demand indicator is provided between a material sufficiency indicator and a start of the operation.

25. The computer implemented method of claim 22 wherein the displayed chart also includes a material supply indicator indicating a time of a supply of some of the material.

26. The computer implemented method of claim 22 wherein the operation is a first operation performed by a first resource, wherein the displayed chart also includes a material supply indicator indicating a time of a supply of some of the material from a completed second operation performed by a second resource.

27. The computer implemented method of claim 22 wherein the displayed chart operation is a first operation performed by a first resource, wherein a material supply indicator indicates a time of a supply of some of the material from inventory.

* * * * *